March 2, 1971     R. R. GOINS ET AL     3,566,449
APPARATUS FOR MOLDING PLASTIC FOAM
Filed Nov. 27, 1968

INVENTORS
R. R. GOINS
D. E. PERRY
BY
Young & Quigg
ATTORNEYS

United States Patent Office

3,566,449
Patented Mar. 2, 1971

3,566,449
APPARATUS FOR MOLDING PLASTIC FOAM
Robert R. Goins and Dan E. Perry, Bartlesville, Okla., assignors to Phillips Petroleum Company
Filed Nov. 27, 1968, Ser. No. 779,495
Int. Cl. B29c 1/00
U.S. Cl. 18—5                                7 Claims

ABSTRACT OF THE DISCLOSURE

Smooth-surface, foamed plastic articles are made by charging a foam melt into a mold between restraining elastic sheets and then releasing the restraining force to allow the charge to expand to the mold walls.

---

It is a common practice in the plastics industry to mold various objects from foamed materials. The foam is lighter in weight than the solid plastic and has good insulating properties. In general, the molding process involves heating a thermoplastic material in a confined zone and adding a blowing agent. The resulting mixture is then extruded into a mold and allowed to expand to fill the mold. However, a problem is often encountered if a portion of the foam is permitted to contact the cool walls of the mold before the remainder of the foam has contacted the mold walls. The resulting irregular cooling can produce undesirable creases and folds in the surface of the molded article.

One suggested method for eliminating this problem has been to keep the mold walls heated during injection and expansion of the foam and then quickly cooling the mold after the the foam has completely filled the mold. The trouble with this proposal is that an extra step is introduced which is not only time consuming but also adds to the expense of the operation.

We have discovered that the above problems can be eliminated by providing elastic sheets in the mold and extruding the plastic foam into the mold between the sheets. A pressure is maintained between the sheets and the mold walls until the full charge of foam is positioned within the mold. The pressure is then released to allow the foam to expand evenly throughout the mold and to reach all of the walls at approximately the same time. In another embodiment of this invention a plastic film is used to laminate the article to be formed. In still another embodiment, the sheets can be in the form of a flexible container into which the foam is extruded.

Accordingly, it is an object of the present invention to provide a method and apparatus for producing foamed articles having smooth surfaces. It is a further object to provide a method and apparatus for laminating the surface of foamed plastic articles.

Figure 1:
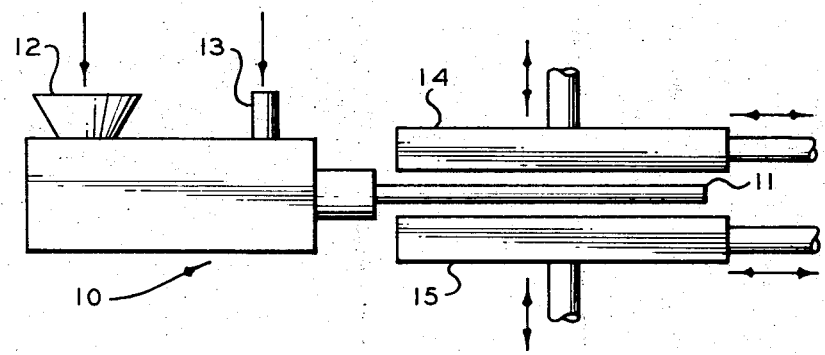
Figure 2:
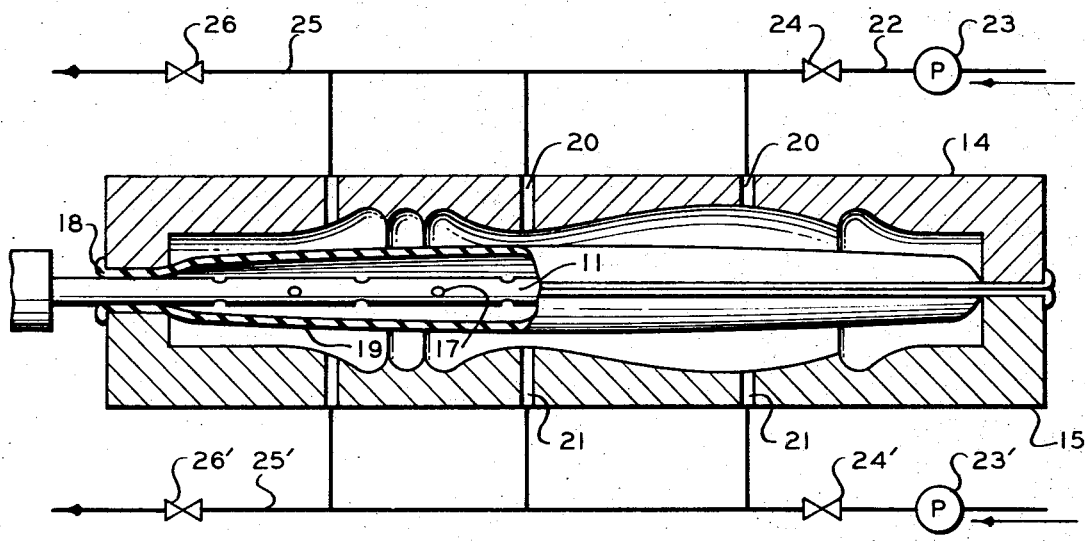
Figure 3:
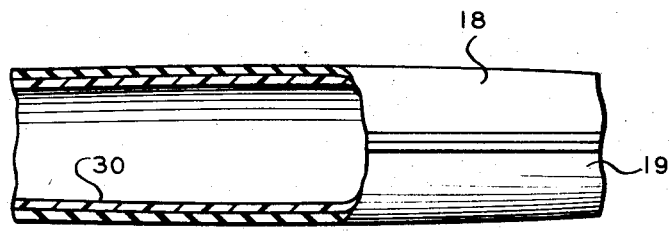

In the drawing, FIG. 1 is a schematic view of an extruder and mold employed to carry out the process of this invention. FIG. 2 is a detailed view, shown partially in section, of the mold of FIG. 1. FIG. 3 is a partial elevational view in cross section of elastomeric layers and laminate layers employed in accordance with another embodiment of the invention.

In FIG. 1 there is shown an extruder 10 which is provided with an elongated outlet nozzle 11. Thermoplastic material to be molded is introduced into the extruder through a hopper 12, and a blowing agent is introduced through a conduit 13. The polymer is melted within the extruder and the blowing agent is incorporated into the polymer so that the melt extruded through nozzle 11 is in a condition to expand when external pressure is released. Extruder 10 can advantageously be of the type described in U.S. Pat. 3,342,913, for example. Nozzle 11 extends between two mold halves 14 and 15 which are adapted to be moved together to enclose the nozzle within the mold, as illustrated in FIG. 2. Of course, the mold can be formed of more than two sections if desired. Mold halves 14 and 15 are also adapted to be moved away from and toward extruder 10 so that nozzle 11 can be withdrawn from the mold after the extrudate material is deposited within the mold. These movements of the mold halves can be accomplished by any suitable actuating equipment, either mechanical, hydraulic, pneumatic or electrical. As an alternative, extruder 10 can be moved back from the mold to withdraw nozzle 11.

As illustrated in FIG. 2, nozzle 11 is provided with a plurality of holes 17 through which the molten extrudate flows to partially fill the interior of the mold. A first elastomeric sheet 18 is positioned within mold half 14 between nozzle 11 and the wall of the mold, and a second elastomeric sheet 19 is similarly positioned within mold half 15. The edges of these sheets preferably are attached to the respective mold halves by the use of suitable adhesives or mechanical fastening means. Sheets 18 and 19 are sufficiently flexible as to permit expansion into engagement with the walls of the respective mold halves. Mold halves 14 and 15 advantageously are of such configuration as to provide an inlet opening which is substantially the same diameter as nozzle 11 so that there is no loss of foamed material from within the mold when the mold is being filled.

Mold half 14 is provided with one or more openings 20 through which a fluid can be introduced and withdrawn. Mold half 15 is provided with similar openings 21. An inlet conduit 22, which has a pump 23 and a valve 24 therein, is connected to openings 20. An outlet conduit 25, which has a valve 26 therein, is also connected to openings 20. Similar conduits, which are designated by primed reference numerals, are connected to openings 21.

In the operation of the apparatus of this invention, mold halves 14 and 15 initially are open, as illustrated in FIG. 1. The two mold halves are then moved together to the position illustrated in FIG. 2, thereby enclosing nozzle 11. Valves 24 and 24' are opened and valves 26 and 26' are closed so that pumps 23 and 23' deliver fluid under pressure to openings 20 and 21. The resulting fluid pressure compresses elastomeric sheets 18 and 19 about nozzle 11. Molten thermoplastic material containing the blowing agent is then extruded through holes 17 of nozzle 11 to deposit a predetermined quantity of this material in the region immediately surrounding the nozzle. The pressures supplied by pumps 23 and 23' are adjusted with respect to the outlet pressure of the extruder so that a predetermined quantity of the foamed material can be extruded through nozzle 11 against the restraining pressure. However, the applied pressure is sufficient to prevent sheets 18 and 19 from expanding to the walls of the mold at this time. If desired, the restraining pressure can be supplied from a single source. After the desired quantity of extrudate is positioned between the sheets, the mold halves are moved relative to extruder 10 so that nozzle 11 is partially withdrawn. It is desirable that the nozzle be withdrawn until the tip thereof (which does not contain holes 17) blocks the inlet opening of the mold halves. This seals the mold opening to prevent loss of foamed material from the interior of the mold. Valves 24 and 24' aren then closed and valves 26 and 26' are opened. This permits the pressurized fluid within the mold halves to be vented such that the foamed material is free to expand to fill the interior of the mold. As a result of this sudden pressure release, the foamed material expands uniformly to contact substantially the entire wall of the mold at the same time. Thereafter, the mold halves are moved apart to permit the molded object to be withdrawn. If desired, the mold halves can be provided with external cooling means to provide more rapid cooling of the foam.

Elastomeric sheets 18 and 19 are formed of a material which is sufficiently flexible to permit the foam to expand rapidly into the mold halves. The sheets must also be made of a material which is capable of withstanding the temperature of foamed material as it is extruded from extruder 10. Silicon rubber is an example of a material which can be employed to advantage for this purpose.

In another embodiment of this invention which is illustrated in FIG. 3, additional sheets of material or a tube 30 is positioned inside elastomeric sheets 18 and 19. For example, tube 30 can be formed of a flexible thermoplastic material which is to be employed as a surface layer on the final molded article. The extruded plastic contacts tube 30 which expands to form a surface coating on the final molded object. In still another embodiment of this invention, sheets 18 and 19 of FIG. 2 can be replaced by an elongated tube which encloses nozzle 11 and which is provided with a single opening through which the nozzle is inserted. This tube can expand with the plastic material in place of sheets 18 and 19 and be removed with the finished article. The tube can then be discarded or remain on the object to provide a coating. Thus, any of several configurations of foam restraining means can be employed.

While this invention has been described in conjunction with presently preferred embodiments, it should be evident that it is not limited thereto.

What is claimed is:

1. Molding apparatus comprising a mold formed of at least two sections which are adapted to be closed to define a mold cavity, said mold having an inlet opening communicating with said cavity through which material to be molded can be introduced; a flexible fluid-impermeable retaining member positioned within said mold so that the interior of said member is in communication with said opening so that material introduced into said mold through said opening is disposed within said flexible member; a fluid pressure source for exerting pressure on the exterior surface of the retaining member, thereby preventing said member from being expanded to engage the walls of the mold cavity when material to be molded is introduced through said opening; first conduit means connected between said pressure source and the interior of said mold at a region outside the exterior surface of said retaining member; and second conduit means, having a valve therein, communicating with the interior of said mold, exterior of said member, to permit fluid pressure to be vented from the interior of said mold when said valve is opened.

2. The apparatus of claim 1 wherein said mold is formed of two mold halves, said mold halves being of such configuratiton as to define a mold cavity when the two mold halves are positioned in engagement with one another, and wherein said flexible retaining member comprises two sheets of elastomeric material, said sheets being positioned across respective mold halves so that material introduced through said inlet opening is positioned between said two sheets.

3. The apparatus of claim 1 wherein said flexible retaining member is an elastomeric bag having an opening aligned with said inlet opening so that material to be molded can be introduced into said bag through said opening.

4. The apparatus of claim 1, further comprising an extruder having a nozzle through which foamed extrudate can be ejected, said extruder being positioned with respect to said mold so that extrudate emitted from said nozzle enters said mold through said inlet opening.

5. The apparatus of claim 4 wherein said nozzle extends into said mold, and further comprising means to move said mold relative to said extruder so that said nozzle can be withdrawn from the interior of said nozzle.

6. The apparatus of claim 5, wherein said inlet opening and said nozzle are of substantially the same cross section so that the end of said nozzle blocks inlet opening when said nozzle is partially withdrawn from said mold.

7. The apparatus of claim 2 wherein said first and second conduit means communicate with the first of said two mold halves; and further comprising a second fluid pressure source; third conduit means connected between said second pressure source and the interior of the second of said two mold halves so that pressure from said second source is exerted on the exterior side of the sheet of material thereacross; and fourth conduit means, having a second valve therein, communicating with the interior of said second mold half, on said exterior side of the sheet of material thereacross, to permit fluid pressure to be vented from the interior of said second mold half when said second valve is opened.

References Cited
UNITED STATES PATENTS

| | | | |
|---|---|---|---|
| 2,224,363 | 12/1940 | Voit et al. | |
| 2,394,122 | 2/1946 | Urmston | 264—45 |
| 2,976,577 | 3/1961 | Gould | 264—45 |
| 2,977,639 | 4/1961 | Barkhuff et al. | 264—45 |
| 3,187,069 | 6/1965 | Pincus et al. | 264—45 |
| 3,306,960 | 2/1967 | Weissman et al. | 18—30X |
| 3,347,966 | 10/1967 | Seefluth. | |

J. SPENCER OVERHOLSER, Primary Examiner

M. O. SUTTON, Assistant Examiner

U.S. Cl. X.R.

18—30, 34